United States Patent
Mason et al.

(10) Patent No.: US 8,654,982 B2
(45) Date of Patent: Feb. 18, 2014

(54) REDUCING POWER CONSUMPTION IN SINK DEVICES BY HAVING SINKS RECEIVE ONLY LEFT AUDIO CHANNEL OR RIGHT AUDIO CHANNEL

(75) Inventors: Ralph D. Mason, Ottawa (CA); Anita J. Netherton, Ottawa (CA)

(73) Assignee: SMSC Holdings S.A.R.L., Luxembourg (LU)

( * ) Notice: Subject to any disclaimer, the term of this patent is extended or adjusted under 35 U.S.C. 154(b) by 466 days.

(21) Appl. No.: 13/097,757

(22) Filed: Apr. 29, 2011

(65) Prior Publication Data

US 2012/0275602 A1 Nov. 1, 2012

(51) Int. Cl.
*H04H 20/47* (2008.01)
*H04H 20/88* (2008.01)
*H04H 40/36* (2008.01)

(52) U.S. Cl.
USPC ........ 381/2; 381/6; 381/14; 381/16; 381/311; 455/522; 455/41.2; 375/219

(58) Field of Classification Search
USPC ................. 381/2, 6, 14, 16, 311, 77, 80, 315; 455/522, 41.2; 375/219; 700/94
See application file for complete search history.

(56) References Cited

U.S. PATENT DOCUMENTS

| | | | |
|---|---|---|---|
| 7,233,769 B2 * | 6/2007 | Richenstein et al. | ........ 455/3.06 |
| 7,876,921 B2 | 1/2011 | Harvey et al. | |
| 2008/0101623 A1 | 5/2008 | Gleissner et al. | |

* cited by examiner

*Primary Examiner* — Vivian Chin
*Assistant Examiner* — Paul Kim
(74) *Attorney, Agent, or Firm* — King & Spalding L.L.P.

(57) ABSTRACT

A wireless audio device may realize power savings when processing multi-channel data, e.g. 2-channel stereo audio data, by splitting the multi-channel block data into separate data blocks for each channel, e.g. Left-channel data block and Right-channel data block, and processing each separate data block independently in the source device to generate respective data packets targeting corresponding sink devices, e.g. a Left earphone and a Right earphone. The source device may then transmit each data packet to a different corresponding sink device, e.g. a Left-channel packet to a Left earphone and a Right-channel packet to a Right earphone. The data packets may also include header information indicative of whether a next packet is intended for a given sink device, enabling sink devices to enter sleep mode when the header information indicates that a next packet is not intended for the given sink device, to save power.

21 Claims, 7 Drawing Sheets

REDUCING POWER CONSUMPTION IN SINK DEVICES BY HAVING SINKS RECEIVE ONLY LEFT AUDIO CHANNEL OR RIGHT AUDIO CHANNEL

BACKGROUND OF THE INVENTION

1. Field of the Invention

This invention relates to RF transceiver design, and, more particularly, reducing power consumption in an audio receiving device.

2. Description of the Related Art

Radio frequency (RF) transmitters/receivers are used in a wide variety of applications, including wireless network interfaces, mobile telephones, and Bluetooth interfaces. RF transceivers also feature prominently in wireless audio technology directed to headphones and earphones, home audio/theater systems and speakers, portable audio/media players and automotive sound systems. Robust, high-quality audio and low-power RF capability can make it possible for consumer and automotive original equipment manufacturers (OEMs) to integrate wireless audio technology into portable audio devices and sound systems. Overall, various RF technologies lend themselves to a number of applications in the consumer world to create high-fidelity home theater environments and distribute audio in the home and other environments.

A radio communication system typically requires tuned circuits at the transmitter and receiver, all tuned to the same frequency. The transmitter is an electronic device that propagates an electromagnetic signal, representative of an audio signal, for example, typically with the aid of an antenna. An RF transceiver is designed to include both a transmitter and a receiver, combined to share common circuitry, many times appearing on the same piece of integrated circuit (IC) chip. If no circuitry is common between transmit and receive functions, the combined device is referred to as a transmitter-receiver. Transceivers usually combine a significant amount of the transmitter and receiver handling circuitry.

RF Transceivers use RF modules for high-speed data transmission. The circuits in a digital RF architecture can operate at frequencies of up to 100 GHz. In most systems, digital processors or processing elements (which are oftentimes software-programmable) are used to perform conversion between digital baseband signals and analog RF, and oscillators are used to generate the required periodic signals. Many RF circuits make use of a voltage-controlled oscillator (VCO), in which the oscillation frequency is controlled by a voltage input, and the oscillation frequency is controlled through an applied DC voltage. Oftentimes, wireless audio systems also have a high demand for low power operation, for example when operating on battery power. In order to prolong the battery life of such wireless audio systems, it is oftentimes desirable to reduce the power consumption of various components of the wireless audio system as much as possible.

Other corresponding issues related to the prior art will become apparent to one skilled in the art after comparing such prior art with the present invention as described herein.

SUMMARY OF THE INVENTION

In one set of embodiments, a wireless audio device (which may be implemented as an integrated circuit, or chip) may have a transmit path and a receive path, and may operate in source mode or sink mode. In one set of embodiments, the wireless audio device may be divided into various functional blocks, one of which may be a digital baseband and processing block that performs a variety of audio data processing functions. The digital processing may operate on audio data according to at least two different modes, a normal mode and a dual-sink mode. In normal mode, a stereo audio channel may be set to multiple sink devices (specifically two devices), and the entire stereo (i.e. both channel) information may be sent to all the sink devices. Each sink device may be a mono device corresponding to a respective one of the channels, and may receive the entire information, select its corresponding channel information for either left channel or right channel.

In one set of embodiments, the digital processing may operate on the audio data according to a dual-sink mode. In this mode, instead of sending the entire stereo signal to all sink devices, the stereo channel may be first divided into a mono left channel and a mono right channel, since each sink device is a mono device, and thus does not require all the audio information. The transmission of audio data packets for the left channel and the right channel to the sink devices may be interleaved, i.e. specified packets of audio information may either correspond to the left channel or the right channel, and packets intended for the right channel and the left channel may be alternatively transmitted to the sink devices. The transmitted packets may include header information indicating which channel the next packet is intended for, the left channel or the right channel. The sink devices may recognize based on the header information whether the next packet is intended for them or for another sink device. If the next packet is not intended for a given sink device, the given sink device may enter sleep mode. Therefore, the sink devices don't have to receive all the audio data packets, only every other data packet. The receiver may therefore be on for lesser period(s) of time, thus reducing power consumption.

In one set of embodiments, a method for transmitting data over a wireless Radio Frequency (RF) link may include splitting a single multi-channel data block into multiple single channel data blocks, where each given single-channel data block corresponds to a different respective channel, processing the multiple single-channel data blocks independently to generate corresponding single-channel data packets, and transmitting each given single-channel data packet over the wireless RF interface to a different respective sink device that corresponds to the respective channel to which the given single-channel data block also corresponds. The splitting, processing, and transmitting may be performed by a source device. In one embodiment, splitting a single multi-channel data block into multiple single channel data blocks may include splitting Left-and-Right channel audio data into Left-channel audio data and Right-channel audio data. The Left-and-Right channel audio data, and the Left-channel audio data and Right-channel audio data may be uncompressed audio data. The Left-channel audio data and the Right-channel audio data may be independently compressed to generate Left-channel compressed audio packets and Right-channel compressed audio packets, respectively, and the Left-channel compressed audio packets may be transmitted over the wireless RF interface to a wireless Left earphone device, and the Right-channel compressed audio packets may be transmitted over the wireless RF interface to a wireless Right earphone device.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
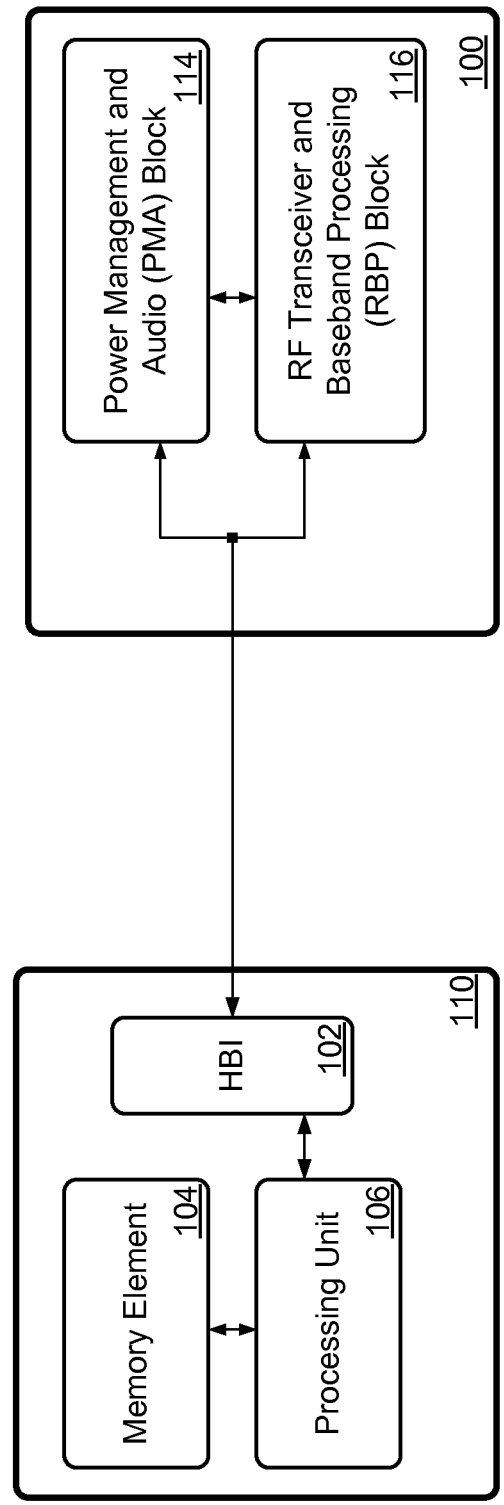
FIG. 1 shows the partial block diagram of one embodiment of a Radio Frequency (RF) system including a host system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 2:
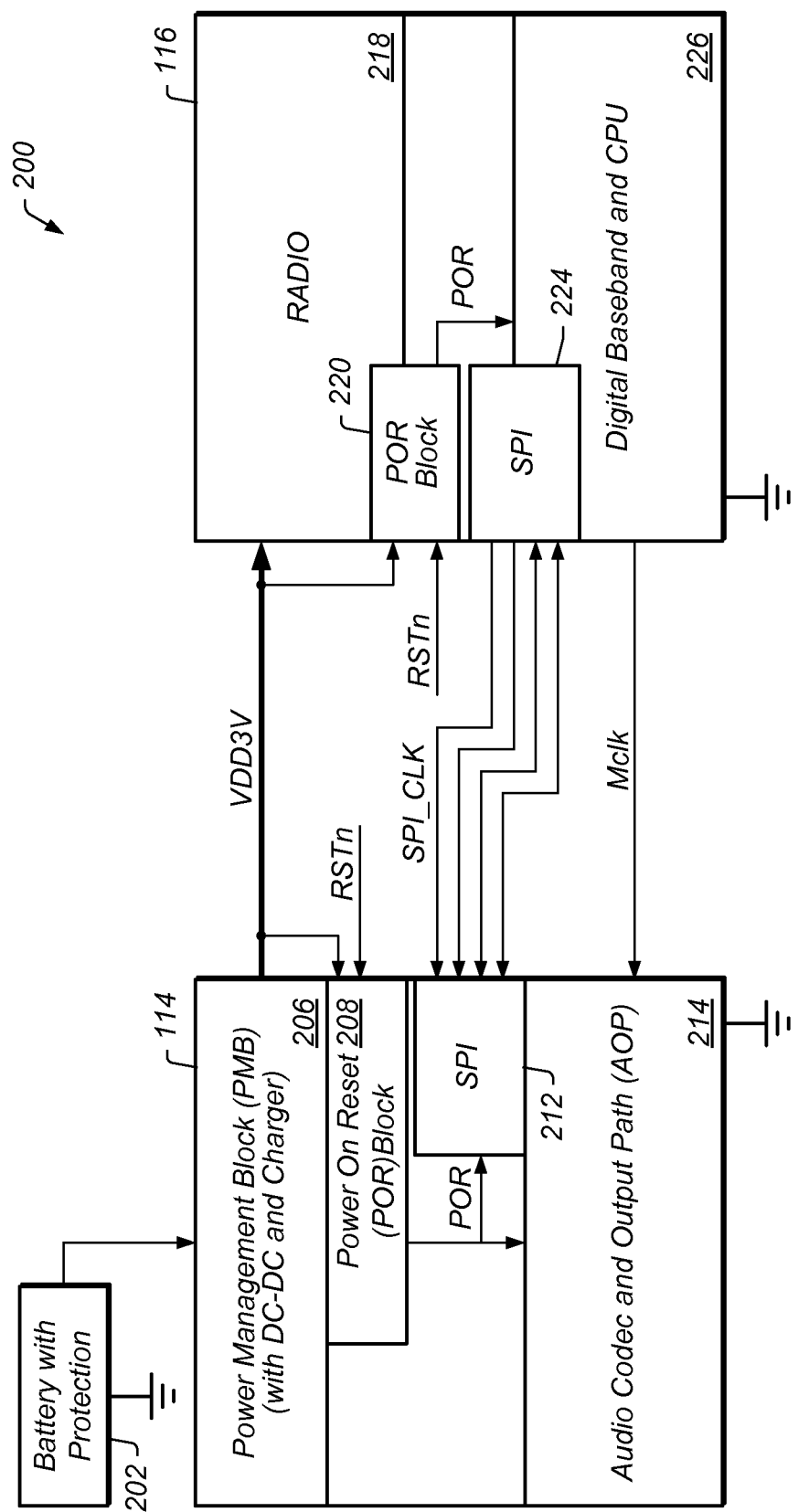
FIG. 2 shows the partial block diagram of one embodiment of an RF transceiver system including a Power Management and Audio (PMA) block and an RF transceiver and Baseband Processing (RBP) block.

FIG. 1 shows the partial block diagram of one embodiment of a wireless audio system that includes a Radio Frequency (RF) transceiver system 100 divided into two main functional components: a Power Management and Audio (PMA) block 114 and an RF Transceiver and Baseband Processing (RBP) block 116. PMA 114 and RBP 116 may each be configured on an Integrated Circuit (IC) or on respective ICs, and may interface with each other via a number of signals (more details of RF transceiver system 100 are shown in FIG. 2 and are discussed in more detail below). PMA 114 and RBP 116 may also couple to components of a host system 110 through a host bus interface (HBI) 102. Host system 110 may include one or more memory elements 104 that can store program code executable by a processing unit 106 (which may be a general purpose central processing unit, or a microcontroller or some similar component) to perform various control operations on RF transceiver system 100. In turn, RF transceiver system 100 may provide certain feedback signals to host system 110 for bidirectional communication between RF transceiver system 100 and host system 110. In some embodiments, RF transceiver system 100 may be designed to be self contained, and perform independently all or most functionality required for RF transceiver system 100 to operate. For example, in one embodiment, RBP 116 may include a microcontroller and memory elements to perform functions that may otherwise be performed under the control of host system 110, and thereby not require host system 110 for performing the necessary RF functions.

As mentioned above, RF transceiver system 100 may include two main components, PMA 114 and RBP 116. PMA 114 itself may include two main blocks as shown in FIG. 2. The first block is a Power Management Block (PMB) 206, and the second block is and Audio Output Path (AOP) 214. PMA 114 may further include a couple of smaller blocks, specifically a Power On Reset (POR) block 208, and a Serial Peripheral Interface (SPI) 212 to exchange data and information with RBP 116. PMB 206 and AOP 214 may be kept functionally separate, though they may be joined by running the AOP supply with the PMB by using a circuit board connection. PMB 206 may include a DC-DC converter, Battery Charger and Button Control Circuitry (not shown/detailed in FIG. 2). In one set of embodiments, AOP 214 converts serial audio data received via SPI 112 into an analog audio signal, and amplifies the analog audio signal using a high efficiency, class-D headphone driver. RBP 116 may include a Radio Transceiver block 218, a Digital Baseband and Processing component 226 (which may include a CPU and/or Microcontroller, as well as memory elements/registers), a POR block 220, and an SPI 224 to exchange data and information with PMA 114.

The state of PMA 114 may be controlled by digital input data through register writes. The digital input data may be delivered as low duty-cycle data, and may be provided into a register bank (not shown) inside PMA 114 by way of SPI 212. Since SPI 212 may be a bidirectional interface, it may also be used to read the state of the register bank. This capability may facilitate the reading of low duty-cycle digital outputs for the purpose of testing. The digital circuitry in PMA 114 may operate on two clock domains. The incoming SPI_CLK may be used to clock data into an SPI Receive FIFO (not shown) within SPI 112, and out of the SPI Transmit FIFO (not shown) also within SPI 212. The remainder of the digital circuitry, which may include registers, Finite State Machines, the Read Port of Receive FIFO, and the Write Port of the Transmit FIFO) may be clocked by an internal clock (Mclk). The core of SPI 212 may be used to retime signals between the two clock domains. The reset for the circuitry SPI 212 may be completely asynchronous, in which case no clock is used during reset. Registers may reset to their default values, to ensure that analog components remain inactive. The circuitry of SPI 212 (and also that of FSMs) may remain enabled (i.e. it may reset to an enabled state), while the clocks may run during SPI operations.

PMA 114 may receive a specified digital audio signal, e.g. a 16-bit Pulse Code Modulated (PCM) audio signal through its serial audio port. The digital audio data may be digitally filtered and up-sampled to a specified Audio CLK frequency, and modulated by Multi-loop Noise Shaping (MASH) in the digital audio codec. In some embodiments, the MASH may be a 2-1, 4-bit implementation. The filtered, up-sampled, and modulated data (in case of a 4-bit implementation, the 4 data bits) may drive the input of a dynamic element matcher (DEM), the output of which may be provided to an analog section of PMA 114. PMA 114 may be implemented with four clock domains. The four clocks may include a master clock Mclk, an audio clock AudioClk, a DC-DC converter clock clkDCDC, and an SPI clock SPI_CLK. All clocks may be derived from a specified crystal frequency (e.g. 22.5792 MHz, in some embodiments), or an audio clock Phase Locked Loop (PLL) output frequency (e.g. 24.576 MHz in certain embodiments). The AudioClk may be derived by passing the Mclk through a divide-by-two circuit. The AudioClk may drive the DEM and the audio digital to analog converter (DAC). Mclk may be generated by the system clock of RBP 116. Mclk may also be used for much of the digital SPI circuitry, including all registers and any SPI FSM. The branch of the clock tree provided to SPI may be gated, and may toggle only during SPI data transfers. The SPI clock may be synchronous with the Mclk. The DC-DC converter clock may be synchronous to the Mclk, and may default to the AudioClk frequency, to mix power supply noise, possibly generated by the DC-DC converter block within PMB 206, to DC, in order to eliminate any negative impact on audio dynamic range.

PMA 114 may power up in a low power mode, in which all analog blocks may be disabled, and digital components/circuitry may not be toggling. To accomplish this, POR block 208 within PMA 114 may generate a POR signal that forces PMA 114 into a known low power state as soon as the supply voltage VDD3V is valid. Note that in order to simplify the block diagram in FIG. 2, clkDCDC and AudioClk are not shown. During power-up the DC-DC converter may be in full standalone mode, its clock generated locally at start-up. In general, the DC-DC clock may not be involved with the digital core of PMA 114. PMB 106 may be standalone to provide the choice of using either external charger and DC-DC converter, or onboard/on-chip charger/DC-DC converter for battery charging and switching regulator functions. The user may also have the option of using onboard/on-chip DC-DC and external charger, in case batteries other than Li+ ion batteries are used. The functionality of PMB 106 may be controlled through a software algorithm, which may be executed for example by processing unit 106 of FIG. 1, or the CPU inside Digital Baseband and CPU block 226 of RBP 116, or possibly by a microcontroller/processing element within PMB 206.

In various embodiments, AOP 214 may include a Class-D headphone driver featuring a switching amplifier that uses Natural Sampling Pulse Width Modulation (PWM) to convert an analog input into a series of Rail-to-Rail pulses. The audio signal may be encoded in the average value of the PWM pulse train and may be recovered from the PWM signal by analog low pass filtering at the headphone. Switching amplifiers are known to be efficient (especially if zero voltage switching techniques are used) since voltage drop across the amplifier output stage can be kept low while delivering current to the load. However, switching amplifiers are also known to have impairments that degrade linearity and signal to noise ratio (SNR). Specifically, power supply pushing/glitching and crossover distortion are signal dependent non-idealities that contribute to total harmonic distortion (THD) in audio Class-D amplifiers. In one set of embodiments, a Class-D headphone driver may be designed with a negative feedback network to compare the output signal with the input signal and suppress non-idealities introduced by the Class-D switching stage, and may perform $2^{nd}$ order noise shaping via the DEM element (not explicitly shown) to reduce noise at low power operation.

Figure 3:
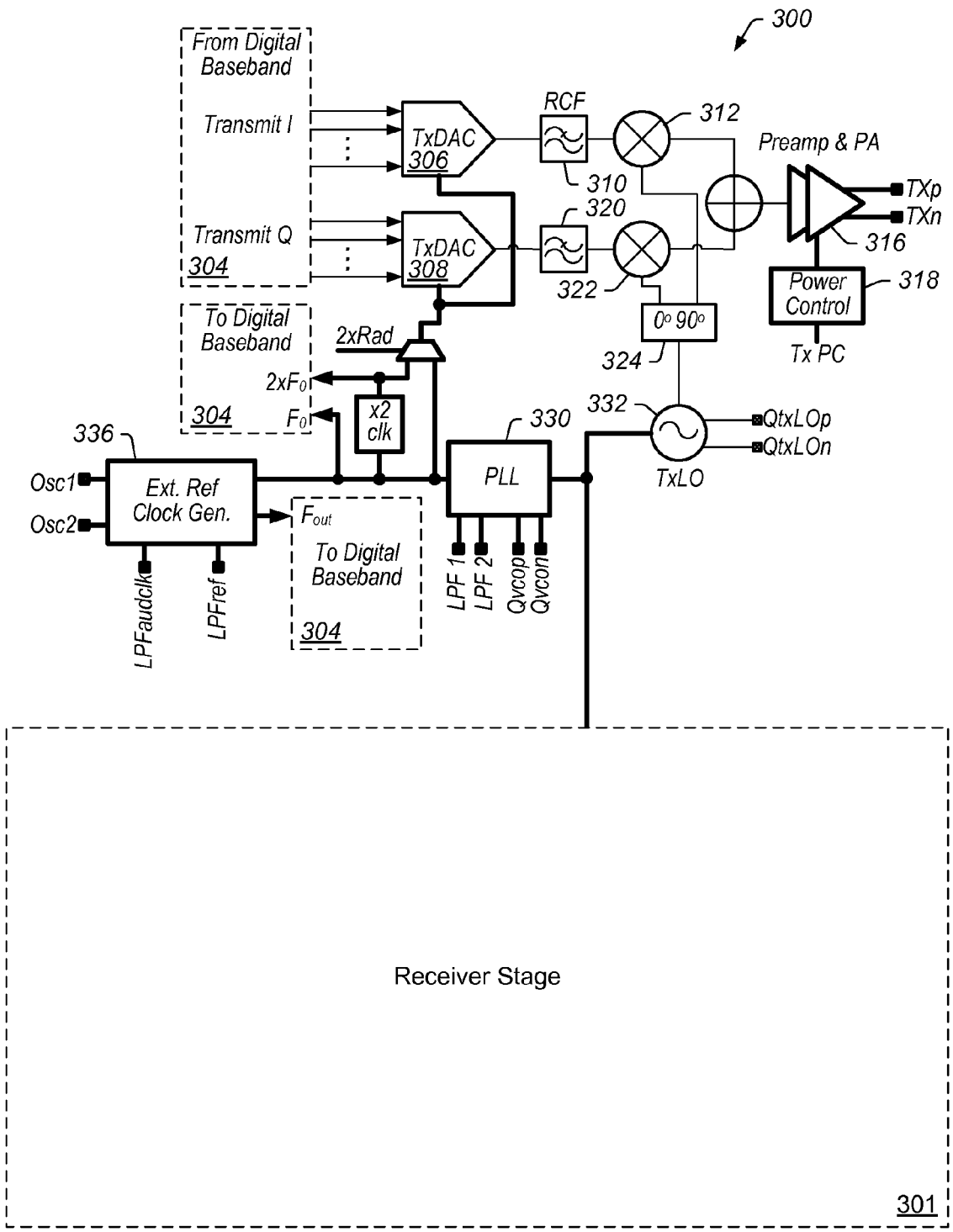
FIG. 3 shows the partial block diagram of one embodiment of the Radio portion of the RPB block of the RF transceiver system of FIG. 2.

FIG. 3 shows the circuit diagram of one embodiment of Radio block 218 from RPB 116. The embodiment shown in FIG. 3 includes a transmitter stage 300, and a receiver stage 301. It should be noted that detail is shown for transmitter stage 300 in order to provide an example of how transmitter stage 300 may be implemented. While no detail is shown for the associated receiver stage 301, those skilled in the art will appreciate that embodiments of receiver stage 301 may be designed to seamlessly operate with transmitter stage 300 according to the principles of operation of transmitter stage 300 disclosed herein. A transmit "I" and a transmit "Q" signal are provided from digital baseband circuitry 304 to digital-to-analog converters (DACs) 306 and 308, respectively, for transmission via amplifier circuitry 316 operating under power control 318. Quadrature modulation is performed by mixers 312 and 322, which are operated according to quadrature signals based on the output of Transmitter Local Oscillator (TxLO) 332, fed through phase shifter 324 to provide the quadrature phase shift. The outputs from DAC 306 and DAC 308 each pass through respective RC filters 310 and 320 before reaching respective mixers 312 and 322. A reference clock generation circuit 336 is used to provide a square wave signal as first base frequency $F_0$ (e.g. a low frequency of approximately 22.5 MHz) periodic signal to phase-locked loop (PLL) 330. Circuit 336 is also used to provide a base frequency $F_{out}$ periodic signal to digital baseband circuitry 304. TxLO 332 may be an injection locked oscillator controlled from PLL 330. Any numeric values provided with respect to the RF system shown in FIG. 3 are exemplary, and various embodiments are not meant to be limited to the specific values provided herein. In one set of embodiments, power control block (PCB) 318 may be configured to execute a transmit power control algorithm to control power on both source and sink side operation of transmitter stage 300.

In one embodiment, RBP 116 is divided into three functional portions: Digital and Analog IO Pads, Analog Design blocks, and a Digital Core. RBP 116 may have two main "modes" of operation: a Source Mode and a Sink Mode. Source and Sink Mode are in reference to the direction of audio travel, but may also be indicative of the clock synchronization. A Source device may receive an audio stream from an external audio source, and send it to a Sink device over a wireless interface. The Sink device, in turn, may pass the audio stream out to a destination. From a clock synchronization perspective, the Source device may contains the "Master" clock and the Sink device may synchronize its oscillator to that Master clock. The Source device may also possibly further synchronize to an external clock signal, but such synchronization would not affect Source and Sink functionality.

Figure 4:
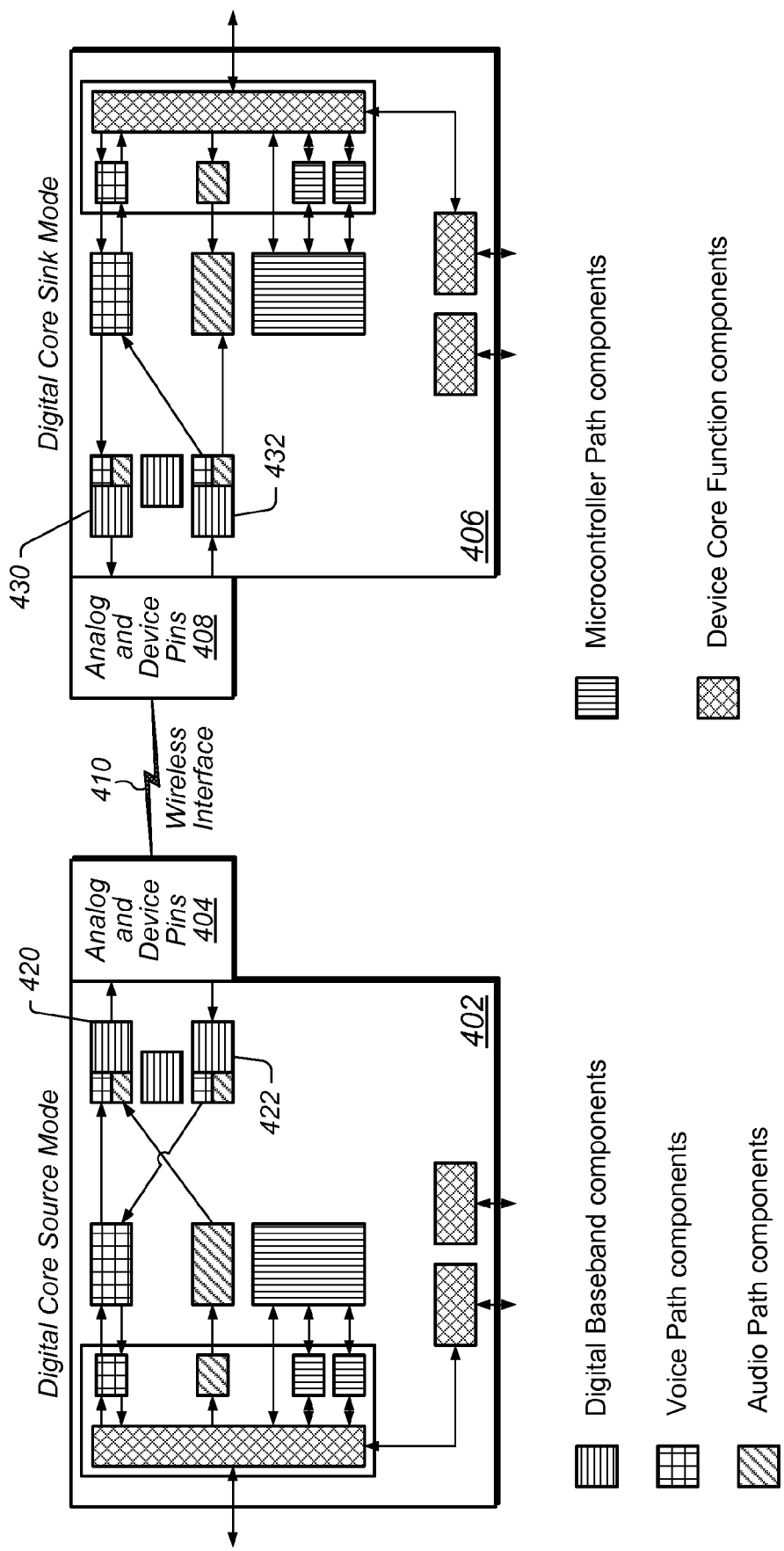
FIG. 4 shows the partial block diagram of one embodiment of the digital core of the RPB block of the RF transceiver system of FIG. 2.

With respect to Source and Sink devices, the expressions "Ingress" and "Egress" are oftentimes used. Ingress refers to the direction of data towards the wireless interface, and Egress refers to circuits controlling or processing data flowing away from the wireless interface. For example, a Source chip may therefore carry Ingress Audio, while a Sink chip may carry Egress Audio. A simplified diagram of one possible Source and Sink pairing is shown in FIG. 4. Blocks 402 and 404 are partial block diagrams showing the high level organization of certain functional blocks in one embodiment of the digital core of RPB 116, operating as a Source. Similarly, blocks 408 and 406 are partial block diagrams showing the high level organization of the functional blocks in the same embodiment of the digital core of RPB 116, operating as a Sink. Source and Sink pairing may be established over wireless (RF) interface 410. The functional blocks within blocks 402 and 406 represent functional groups.

As listed in FIG. 4, the digital functional groups may include Digital Baseband components, Voice Path components, Audio Path components, Microcontroller components, and Device Core Function components. Ingress direction is towards the device pins from the transmit baseband components, specifically from transmit baseband 420 to pins 404, and from transmit baseband 430 to pins 408. Conversely, Egress direction is from the pins to the receive baseband components, specifically from receive baseband 422 to pins 404, and from receive baseband 432 to pins 408. In one set of embodiments, the voice path may be full duplex, i.e., both directions may operate at the same time, while the Audio path may only be receiving or transmitting to the Radio during a mode of operation. The Audio may be transmitting to the Radio in Source Mode and may be receiving in Sink Mode. As mentioned above, Audio data path directions are referred to herein as Ingress and Egress with the Radio (RF transceiver) operating as the reference point.

As shown in FIG. 4, RBP 116 may contain several core functions, illustrated in devices 402 and 406. These core functions may be used to facilitate operation of the higher level data path functions. Examples of this include selecting PAD functionality, reset functions and clock functions. The audio path may take audio data from a Source/Ingress Device Serial Audio Interface (SAI) and may transport it to a Sink/Egress Device and out through the Sink/Egress Device SAI. Programmability may be available on the external audio interfaces (external SAI) of both devices to allow the SAI to interface with a variety of external devices. The Audio Path may also employ a number of strategies to handle power, latency and interferences issues. The Voice path may be bidirectional. It may allow full duplex voice communication across the devices. Each device (such as device 402 and 406) may have an ingress voice path that takes voice data from its programmable Serial Voice Interface (SVI) and may transport it to its paired device, from which it is sent out the egress SVI. This path may employ a number of strategies to handle power, latency and interferences issues. The Microcontroller may support several interfaces, such as GPIO, SPI, TWI, etc.

The Digital Baseband may provide the digital portion of the RF Transceiver. In the ingress direction it may take the digital signaling and process it to be sent to the analog portion of the RF Transceiver. In the egress direction, it may process the signal and recover the original packet created by the ingress radio. The ingress Digital Baseband is referred to as the TX Baseband, and the egress direction it is referred to as the RX Baseband. The Sequencer and Time Synchronization Function (TSF) are functions of the Baseband that allow automation and synchronization of both Basebands relative to their paired device.

Figure 5:
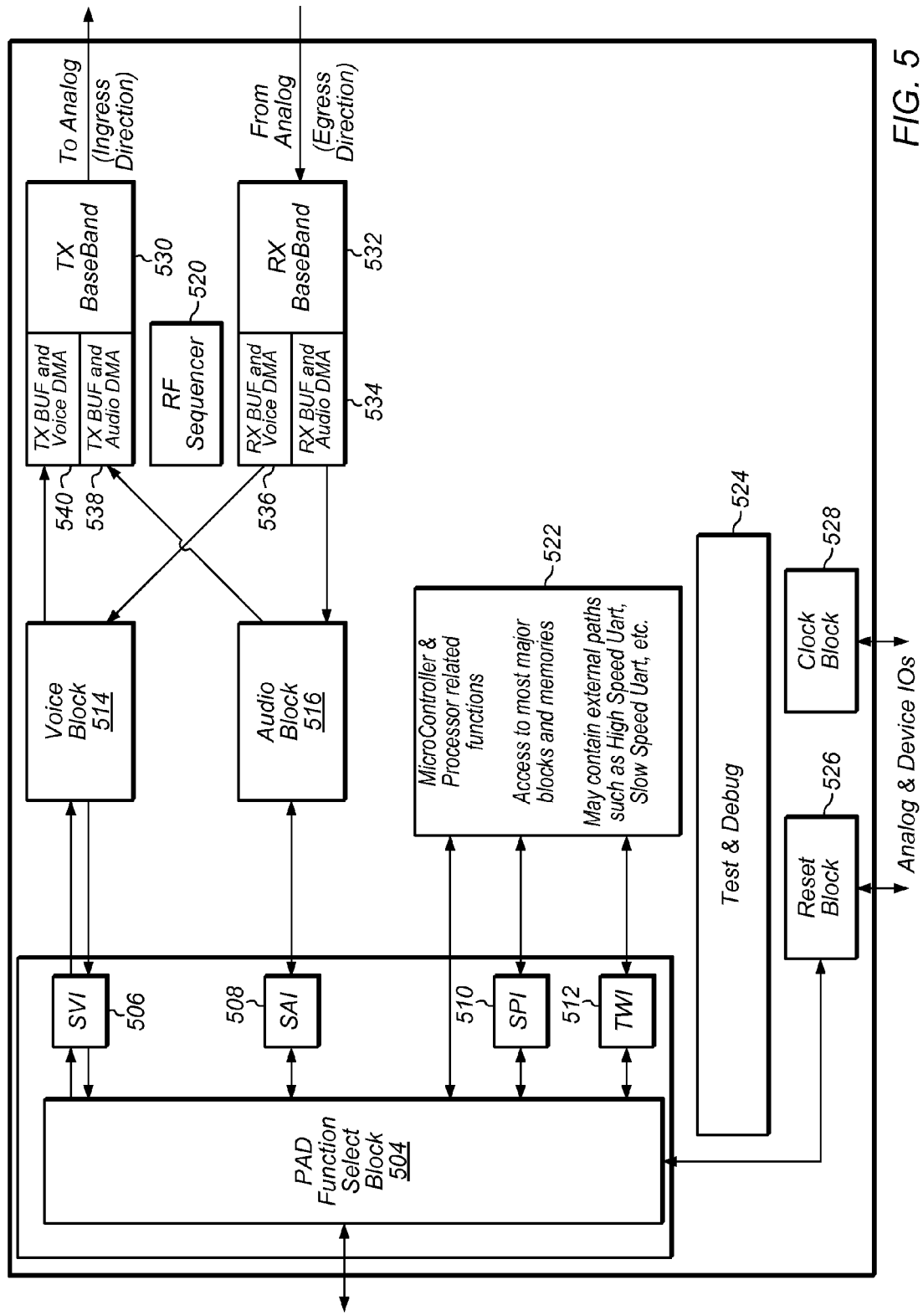
FIG. 5 shows a more detailed partial block of one embodiment the digital core of the RPB block of the RF transceiver system of FIG. 2.

FIG. 5 shows a more detailed block diagram of the digital core shown in FIG. 4. The digital core shown in FIG. 5 may represent either or both blocks 420 and 430 from FIG. 4. The Digital baseband may be composed of a Transmit baseband 350 for packet transmission and Receive baseband 530 for packet reception. It may also include an RF sequencer 520 which may control Baseband operations. In the Ingress direction, the Transmit baseband may read data directly from the Transmit buffer 540/538. In the Egress direction, the Receive baseband may write data directly into the Receive buffer 536/534. Data may be either voice data as indicated by Voice Block 514, or audio data as indicated by Audio Block 516. Voice data may be written into Transmit buffer 540 and read from Receive buffer 536 by Voice block 514, and Audio data may be written into Transmit buffer 538 and read from Receive buffer 534 by Audio block 516. Voice data may be received through the Serial Voice Interface (SVI) 506, while audio data may be received through the Serial Audio Interface (SAI) 508. A Serial Peripheral Interface (SPI) may be used primarily to communicate with peripheral devices, on a shared communication bus. A Two-Wire Interface (TWI) 512 may also be used to communicate with certain peripheral devices. The digital core may also include Microcontroller and processor related function 522, which control and manage access to most major blocks and memories. A reset block 536 may manage digital reset signals, while a clock block 528 may provide the clock signals. Some embodiments may also include a test and debug block 524 which may implement circuitry of logic functionality used specifically for testing the various other components.

Some aspects of the operation of audio block 516 will now be described. In Ingress mode, the Audio Block 516 may obtain data from SAI 508, filter the data and compress it as directed, and then passes the data to Transmit block 530 via buffer 538 when directed by Transmit block 530. In Egress mode the Audio Block 516 may receive data from the Receive block 532 when Receive block 532 signals a transfer is beginning Audio block 516 may subsequently decompress and align the data as appropriate before sending the data to SAI 508. In one set of embodiments, in both modes the Audio block 516 may transmit/receive 2-channel, 16-bit PCM, 44.1 kHz or 48 kHz data stream to/from SAI 508. Audio block 516 may uses a large buffer to allow the handling of interference (referred to herein as the Interference Buffer, or IB). It may also use a lossless compression mechanism to allow better interference handling as well as lower radio power. The lossless compression and decompression paths may result in high quality audio transmission through the system.

Figure 6:
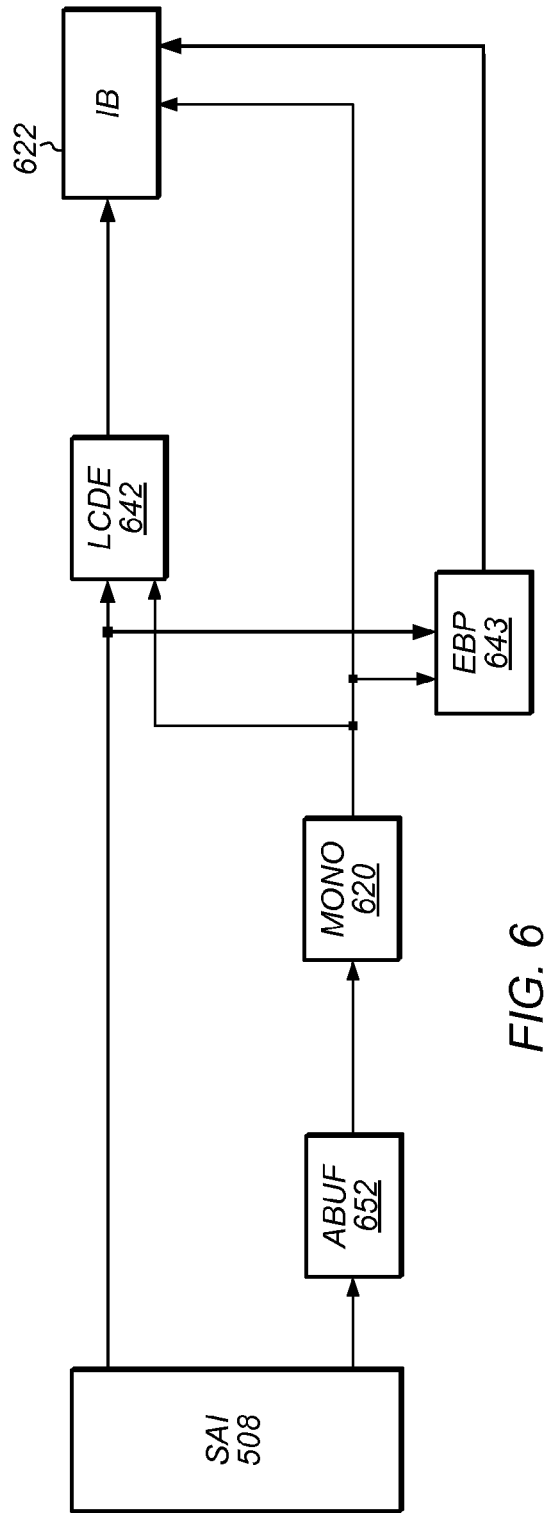
FIG. 6 shows a functional block diagram of one embodiment of an audio path configured for a Normal Ingress mode.
Figure 7:
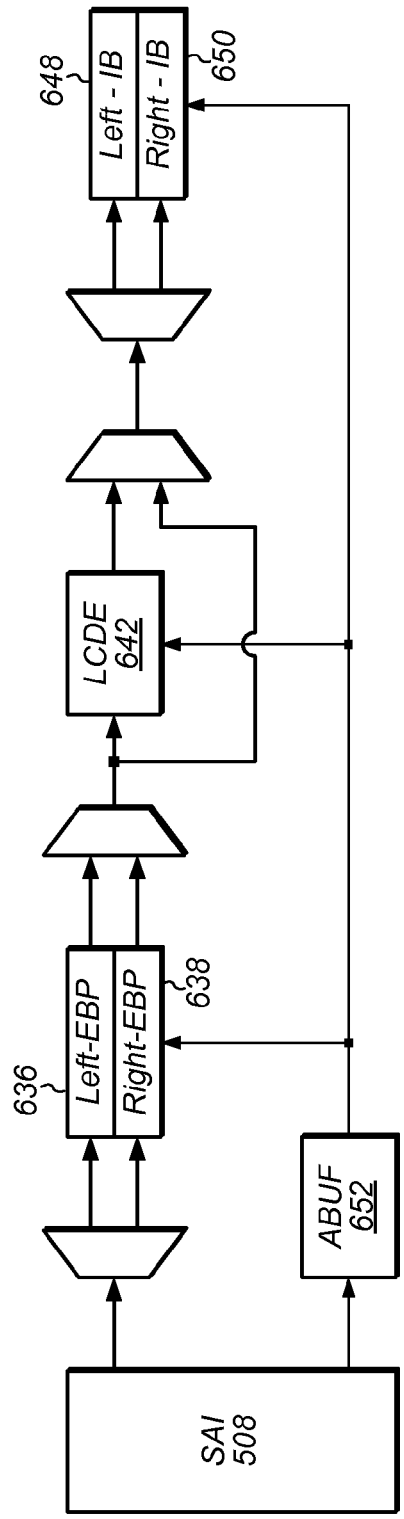
FIG. 7 shows a functional block diagram of one embodiment of an audio path configured for Dual Sink Ingress mode.

In Ingress mode Audio buffer 516 may handle the detection of valid data from SAI 508 and enable the capture of the data into Mono, LCDE (Lossless Compression Decompression Engine) and EBP (Expansion Bypass) modules as appropriate. These modules are illustrated in FIGS. 6 and 7, which will be further described below. The data stream may be divided into equal-sized UABs (Uncompressed Audio Blocks) on the fly. The LCDE may compress each UAB and transferred it to the IB as a variable-sized CAP (Compressed Audio Packet). If the packet expands through application of the compression algorithm, then the data portion of the CAP may be taken from the EBP and transferred directly to the IB. The block diagrams in FIGS. 6 and 7 show Audio Path Modules configured for two types of Ingress modes, a normal mode and a dual-sink mode, respectively. Each diagram depicts a different mode of operation. In both diagrams, the heavier black lines indicate data flow, while the thinner lines indicate control or information signals.

As shown in FIG. 6, in normal mode of operation, when configured for Stereo traffic (mono field setting), all left and right samples from SAI 508 may be passed through LCDE block 642, and a copy of the entire UAB may also stored in EBP module 643. The encoded data from LCDE 642 may be formed into a CAP, and written into IB 622. If the data expands (i.e. the resulting CAP data field exceeds the size of the original UAB), the encoded data from LCDE 642 may be discarded, and the EBP copy may be passed to IB 622 instead, to be put in the CAP. If operation is configured in Mono mode (mono field setting), only the left or right samples may be passed through LCDE 642, and stored in EBP 643. Unused samples may be discarded. MONO module 620 may determine which samples to use, based on the channel designation (i.e. field designation).

As shown in FIG. 7, in dual-sink mode, SAI 508 may provide data to the Expansion Bypass RAM module (636/638). Within the EBP module, the data may be split into left and right channels, 636 and 638, respectively. Left data may be immediately transmitted to LCDE 642, and after being prepared for compression the Left data may be stored in a CSP (Compression Scratch Pad) memory. At that point the Left data may be encoded and stored as a Left-CAP in IB 648. The Right data may then be transmitted to LCDE 642, and may be stored in the CSP memory, at which point the Right data may be encoded and stored as a Right-CAP in IB 650. If any encoding process encounters the expansion encoding case, the raw data may still be read from the corresponding EBP 636/638, and written into the appropriate place within the IB 648/650. CAPs may then be read from IB 648/650 and placed into separate left and right CAP locations within each of the transmit buffers (e.g. Transmit buffers 538). These CAPs may then be transmitted to their respective sink devices.

In ingress mode, the purpose of Audio buffer (ABUF) 652 is to handle SAI 508, which may include determining when data is valid, and indicate it to the downstream blocks. When ABUF 652 is disabled, all incoming data on SAI 508 may be dropped. ABUF 652 may not provide any buffering capability in Ingress mode, as the specified number of bytes required for each sample pair may be collected in LCDE 642 directly. In addition, Audio block 516 may run at a much higher rate than SAI 508, which may lead to no buffering being required, as Audio block 516 may have time to process each sample pair before the next byte arrives from SAI 508. ABUF 652 may also count the bytes streamed on the interface and compare this count against the UAB size setting. Once the UAB size is achieved, ABUF 652 may indicate that a UAB is complete. In dual-sink mode, the ABUF 652 may count the bytes streamed on both left and right channels separately. The UAB Receive interrupt may assert once the right channel UAB size is met. It should be noted that the Left/Right Channel UAB sizes may be the same.

Mono block 620 may use a mono bit to determine if it should allow data from only one (Left or Right) channel to be considered valid. The opposite channel's data may be suppressed to the downstream blocks so they are dropped, which may be achieved by suppressing the data valid indication from ABUF 652. Accordingly, the resulting UAB being passed to LCDE 642 may contain only left or right samples. If the mono bit is not active, Mono block 620 may be unused and may therefore not impact the datapath.

Certain input streams may conceivably cause the compression engine to expand many times past the limit of IB 622. EBP block 643 (636/638 in dual-sink mode) enables the device to prevent buffer overrun situations due the data expansion, facilitating device support for essentially random input data without breaking the system model (causing overruns). EBP 643 (636/638 in dual-sink mode) may store the original data received from SAI 508. With the EBP function enabled, the compressor may detect an expansion condition and store the uncompressed data from EBP 643 (636/638 in dual-sink mode) plus the CAP packet overhead (CAP header) in IB 622 (648/650 in dual-sink mode) instead of just the CAP. This may result in a slight expansion, since it means that a specified number of bytes (e.g. 3 bytes) have been added to the original UAB size. The resulting uncompressed packet may consist of CAP header information and a UAB. The CAP header may have a bit to indicate whether the CAP is actually compressed, to enable the device to properly extract the original UAB on the Egress path.

LCDE 642 may recognize that its compressed CAP is too large once the CAP size hits the UAB limit. EBP 643 may therefore be sized to allow the incoming UAB to be stored while it stores the previous UAB, and transfers it into IB 622. During this transfer, EBP 643 may place its uncompressed packet in the exact location of IB 622 where the previously aborted (expanding) packet was located, to keep the IB CAPs contiguous.

As previously mentioned, and as shown in FIG. 7, in dual-sink mode, the EBP is divided into left and right halves, 636 and 638, respectively. The left UAB may be stored in EBP 636, and may also be processed in LCDE 642 as the data arrives from SAI 508, while the right UAB is stored for subsequent processing. Left and right CAPs may also be stored in separate areas of the IB, specifically in Left IB 648 and Right IB 650. EBP 648/650 may also be sized appropriately for this mode, i.e., it may be sized to have sufficient space to allow storage of as much new data as can arrive during processing of both left and right UABs. In Ingress mode (i.e. when transmitting data), LCDE 642 may receive bytes from SAI 508, and may collect those bytes into UAB portions consisting of one Left/Right sample pair (which may be 4 bytes in some embodiments). In one set of embodiments, in both mono mode and dual-sink mode, LCDE 642 may still treat incoming samples as Left-Right-Left-Right, even though they may all be Left samples of they may all be Right samples, but maintain the order of the samples are the were originally received.

The Interference Buffer (IB 622 and 648/650) may allow buffering of CAPs to allow for interference and retransmission over the Radio link without data loss (unless there is extreme interference). Once a complete CAP has been written into IB 622 (648/650), LCDE 642 may interrupt the Microcontroller (e.g. the Microcontroller in 522), and may store the location of the first byte of the CAP Header. It may also store the CAP length (not including header).

Figure 8:
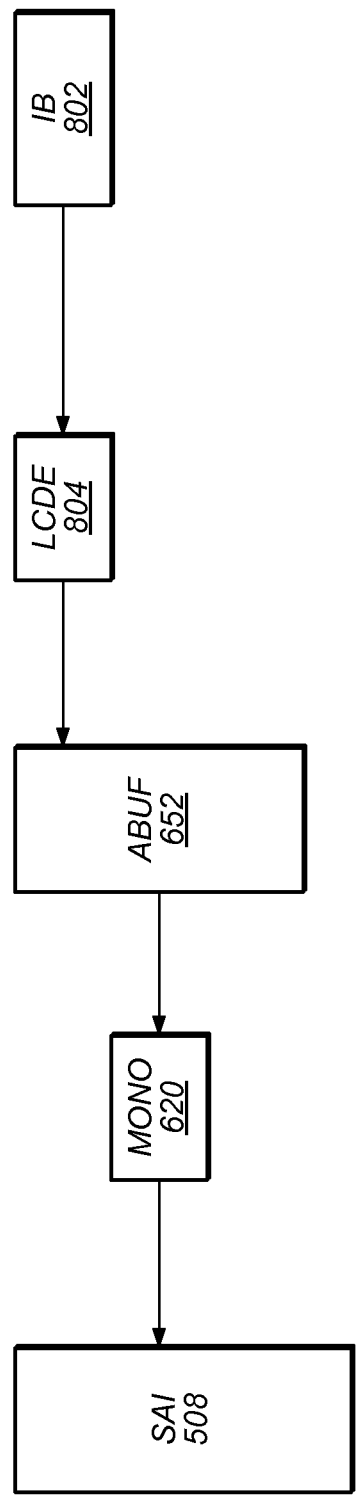
FIG. 8 shows a functional block diagram of one embodiment of an audio path configured for Egress mode.

FIG. 8 shows a functional block diagram of one embodiment of an audio path configured for Egress mode. The Egress Audio Path may receive data from Receive block 532 into IB 802. Data may be read and decompressed one CAP at a time by Audio Block 516, then transferred to SAI 508 one byte at a time. The path may handle either Stereo or Mono samples. Data may be written into IB 802 from Receive block 532. The processing of audio data may be on a pull basis, as may be required by the constant-rate SAI. When SAI 508 has completed transmission of one byte, it may request the next byte from ABUF 652. When the queue in ABUF 652 is empty, it may requests more data from LCDE block 804. LCDE block 804 may process one UAB at a time. Data may be extracted from a CAP, decompressed (if required) and then collected into a UAB in a buffer in LCDE 804, to be streamed out to ABUF 652 as required. Mono block 620 may perform similar functionality as in the Ingress path.

Therefore, various embodiments of a wireless audio device may realize power savings when processing multi-channel data, e.g. 2-channel stereo audio data, by splitting the Left and Right channel uncompressed audio block data into a Left channel uncompressed audio block and a Right channel uncompressed audio block, compressing the Left channel uncompressed audio block and the Right channel uncompressed audio block independently in the source device, and the source device transmitting the Left compressed audio packet to a corresponding Left sink device (which may be a Left earphone), and transmitting the Right compressed audio packet to a corresponding Right sink device (which may be a Right earphone).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for transmitting data over a wireless Radio Frequency (RF) link, the method comprising:
   splitting a single multi-channel data block into multiple single-channel data blocks, each given single-channel data block of the multiple single-channel data blocks corresponding to a different respective channel;
   processing the multiple single-channel data blocks independently to generate corresponding single-channel data packets; and
   transmitting each given single-channel data packet over the wireless RF interface to a different respective sink device that corresponds to the respective channel corresponding to the given single-channel data block.

2. The method of claim 1, wherein said splitting, processing, and transmitting is performed by a source device.

3. The method of claim 1, wherein said splitting comprises splitting Left-and-Right channel audio data into Left-channel audio data and Right-channel audio data.

4. The method of claim 3, wherein the Left-and-Right channel audio data, and the Left-channel audio data and Right-channel audio data comprise uncompressed audio data.

5. The method of claim 4, wherein said processing comprises independently compressing the Left-channel audio data and the Right-channel audio data to generate Left-channel compressed audio packets and Right-channel compressed audio packets, respectively.

6. The method of claim 5, wherein said compressing comprises lossless compressing.

7. The method of claim 5, wherein said transmitting comprises transmitting the Left-channel compressed audio packets to a wireless Left earphone device and transmitting the Right-channel compressed audio packets to a wireless Right earphone device.

8. The method of claim 1, wherein said processing comprises including respective channel information in each given single-channel data packet, wherein the respective channel information is indicative of whether a next packet is intended for the given sink device receiving the given single-channel data packet.

9. The method of claim 8, further comprising the given sink device entering sleep mode if the respective channel information indicates that the next packet is not intended for the given sink device.

10. A wireless device comprising:
a digital baseband processor configured to:
receive multi-channel data;
split the multi-channel data into multiple single-channel data blocks, each given single-channel data block of the multiple single-channel data blocks corresponding to a different respective channel; and
process the multiple single-channel data blocks independently to generate corresponding single-channel data packets; and
a Radio Frequency (RF) transceiver configured to receive the single-channel data packets, and transmit each given single-channel data packet of the single-channel data packets over a wireless RF interface to a different respective sink device that corresponds to the respective channel corresponding to the given single-channel data block.

11. The wireless device of claim 10, wherein the multi-channel data is Left-and-Right channel audio data, wherein the baseband processor is configured to split the Left-and-Right channel audio data into Left-channel audio data and Right-channel audio data.

12. The wireless device of claim 11, wherein the Left-and-Right channel audio data, and the Left-channel audio data and Right-channel audio data comprise uncompressed audio data.

13. The wireless device of claim 12, wherein the baseband processor is configured to independently compress the Left-channel audio data and the Right-channel audio data to respectively generate Left-channel compressed audio packets and Right-channel compressed audio packets.

14. The wireless device of claim 13, wherein the RF transceiver is configured to transmit the Left-channel compressed audio packets to a wireless Left earphone device, and transmit the Right-channel compressed audio packets to a wireless Right earphone device.

15. The wireless device of claim 10, wherein the baseband processor is configured to include respective channel information in each given single-channel data packet, wherein the respective channel information is indicative of whether a next packet is intended for the given sink device receiving the given single-channel data packet.

16. A wireless audio system comprising:
a source device configured to:
receive single multi-channel data from a peripheral device;
split the single multi-channel data into multiple single-channel data blocks, each given single-channel data block of the multiple single-channel data blocks corresponding to a different respective channel of a plurality of channels;
process the multiple single-channel data blocks independently to generate corresponding single-channel data packets; and
transmitting each given single-channel data packet over the wireless RF interface; and
a plurality of sink devices, wherein each given sink device of the plurality of sink devices corresponds to a different respective channel of the plurality of channels, and wherein each given sink device is configured to receive the given single-channel data packet that corresponds to the same different respective channel to which the given sink device corresponds.

17. The wireless audio system, wherein the source device is configured to include respective channel information in each given single-channel data packet, wherein the respective channel information indicates if a next packet is intended for the given sink device that received the given single-channel data packet.

18. The wireless audio system of claim 10, wherein the multi-channel data is Left-and-Right channel audio data, wherein the source device is configured to split the Left-and-Right channel audio data into Left-channel audio data and Right-channel audio data.

19. The wireless audio system of claim 18, wherein the Left-and-Right channel audio data, and the Left-channel audio data and Right-channel audio data comprise uncompressed audio data.

20. The wireless audio system of claim 19, wherein the source device is configured to independently compress the Left-channel audio data and the Right-channel audio data to respectively generate Left-channel compressed audio packets and Right-channel compressed audio packets.

21. The wireless audio system of claim 20, wherein the source device is configured to transmit the Left-channel compressed audio packets to a wireless Left earphone device, and transmit the Right-channel compressed audio packets to a wireless Right earphone device.

\* \* \* \* \*